(12) United States Patent
Mickow

(10) Patent No.: US 8,893,395 B2
(45) Date of Patent: Nov. 25, 2014

(54) PIPE ALIGNMENT TOOL

(76) Inventor: Jason Mickow, Wabasha, MN (US)

( * ) Notice: Subject to any disclaimer, the term of this patent is extended or adjusted under 35 U.S.C. 154(b) by 85 days.

(21) Appl. No.: 13/459,895

(22) Filed: Apr. 30, 2012

(65) Prior Publication Data

US 2012/0297635 A1 Nov. 29, 2012

Related U.S. Application Data

(60) Provisional application No. 61/480,096, filed on Apr. 28, 2011.

(51) Int. Cl.
*G01B 11/27* (2006.01)
*G01C 15/02* (2006.01)
*G01C 15/00* (2006.01)

(52) U.S. Cl.
CPC .................................. *G01C 15/002* (2013.01)
USPC .............................................. 33/286; 33/529

(58) Field of Classification Search
USPC .............................. 33/286, 412, 529, DIG. 21
See application file for complete search history.

(56) References Cited

U.S. PATENT DOCUMENTS

| 6,124,935 | A * | 9/2000 | Matthews | 33/286 |
| 6,427,348 | B1 * | 8/2002 | Webb | 33/286 |
| 6,532,676 | B2 * | 3/2003 | Cunningham | 33/286 |
| D574,274 | S * | 8/2008 | D'Olimpia | D10/69 |
| 7,748,127 | B1 * | 7/2010 | Cosimano | 33/286 |
| 8,484,880 | B1 * | 7/2013 | Sellers et al. | 42/116 |
| 8,499,469 | B2 * | 8/2013 | Vukicevic | 33/558 |
| 2001/0034944 | A1 * | 11/2001 | Cunningham | 33/286 |
| 2005/0060901 | A1 * | 3/2005 | Cook | 33/286 |
| 2009/0033921 | A1 * | 2/2009 | Loftis et al. | 33/286 |
| 2011/0167656 | A1 * | 7/2011 | Huang | 33/286 |

* cited by examiner

*Primary Examiner* — G. Bradley Bennett
(74) *Attorney, Agent, or Firm* — Westman, Champlin & Koehler, P.A.

(57) ABSTRACT

A pipe alignment tool includes a main body, a laser source, and a laser calibrator. The main body has a threaded external surface on a proximal end and a cylindrical bore at a distal end. The cylindrical bore has a central axis. The laser source has a proximal end that is removably received in the cylindrical bore. The laser source is configured to discharge a laser beam through a distal end of the laser source along a laser axis. The laser calibrator is configured to adjust the orientation of the laser source relative to the central axis to coaxially align the laser axis with the central axis.

16 Claims, 6 Drawing Sheets

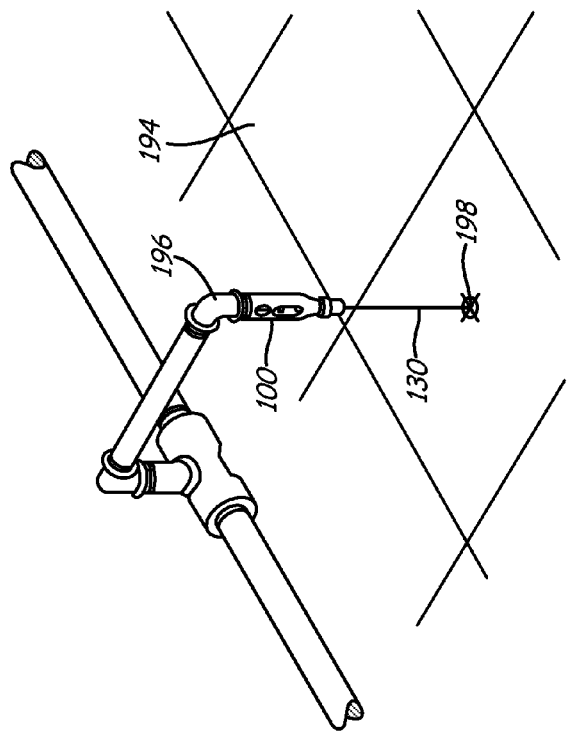
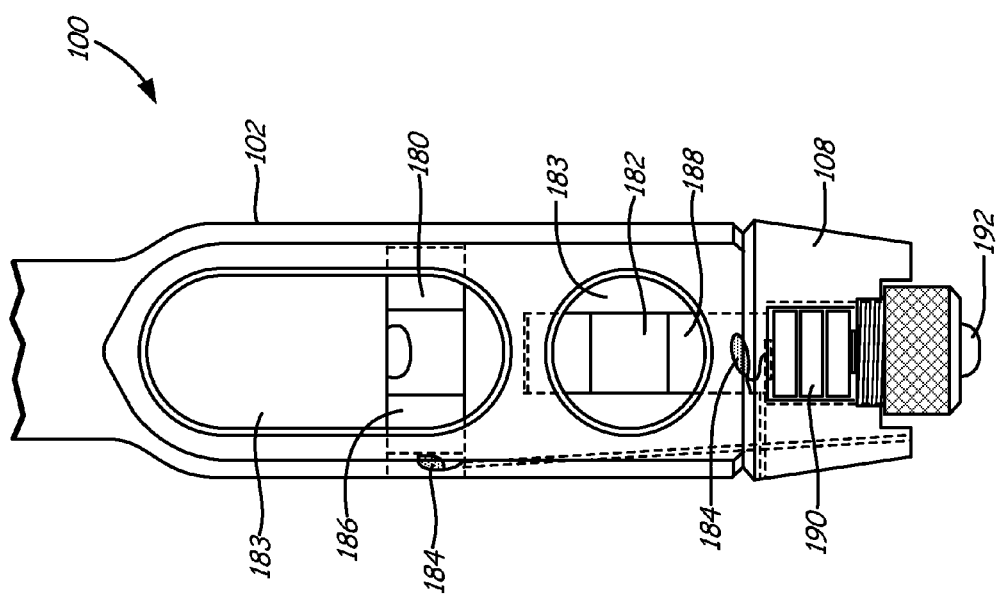

PIPE ALIGNMENT TOOL

CROSS-REFERENCE TO RELATED APPLICATION

The present application is based on and claims the benefit of U.S. provisional patent application Ser. No. 61/480,096, filed Apr. 28, 2011, the content of which is hereby incorporated by reference in its entirety.

FIELD

Embodiments of the invention relate to a pipe alignment tool that discharges a laser beam for use in installing piping, and a method of using the pipe alignment tool.

BACKGROUND

Pipe alignment tools have been used to assist in the installation of piping such as sewage and drainage piping, sprinkler piping, suspended electrical conduit systems, and other conduit and pipe systems. Such alignment tools have been known to employ a laser beam to project an extension of an axis of a pipe or fitting for use in aligning conduit supports, piping, fittings, and other components required in the piping or conduit installation. One exemplary pipe alignment tool is disclosed in U.S. Pat. No. 5,568,265 (Matthews), which includes a threaded end that attaches to a piece of conduit or pipe and a laser source that discharges a laser beam in the direction of the pipe or conduit.

The accuracy of prior art pipe alignment tools is dependent upon the alignment between the laser axis along which the laser beam is projected and the central axis of the piping or fixture that the tool is attached to. Misalignment between the laser axis and the central axis affects the accuracy of measurements and projections, particularly when projecting the laser beam a significant distance from the piping or fixture.

The laser source of such prior art pipe alignment tools are non-removable. This prevents the user from conveniently replacing the laser source in response to a laser source malfunction and prevents the user from utilizing different laser sources, such as one having a different color or energy level.

SUMMARY

Embodiments of the invention are directed to a pipe alignment tool and method. One embodiment of the pipe alignment tool includes a main body, a laser source, and a laser calibrator. The main body has a threaded external surface on a proximal end and a cylindrical bore at a distal end. The cylindrical bore has a central axis. The laser source has a proximal end that is removably received in the cylindrical bore. The laser source is configured to discharge a laser beam through a distal end of the laser source along a laser axis. The laser calibrator is configured to adjust the orientation of the laser source relative to the central axis to coaxially align the laser axis with the central axis.

In one embodiment of the method, a proximal end of a main body of a pipe alignment tool is secured to a support. A proximal end of a laser source is placed in a cylindrical bore at a distal end of the main body. A laser beam is then discharged from a distal end of the laser source along a laser axis. An orientation of the laser source is adjusted relative to a central axis of the cylindrical bore using a laser calibrator of the tool to coaxially align the laser axis with the central axis.

BRIEF DESCRIPTION OF THE DRAWINGS

FIG. 8 is a simplified side view of a pipe alignment tool that includes illuminated bubble levels in accordance with embodiments of the invention.

FIGS. 9-11 illustrate exemplary uses of the pipe alignment tool.

DETAILED DESCRIPTION OF ILLUSTRATIVE EMBODIMENTS

The invention now will be described more fully hereinafter with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 2:
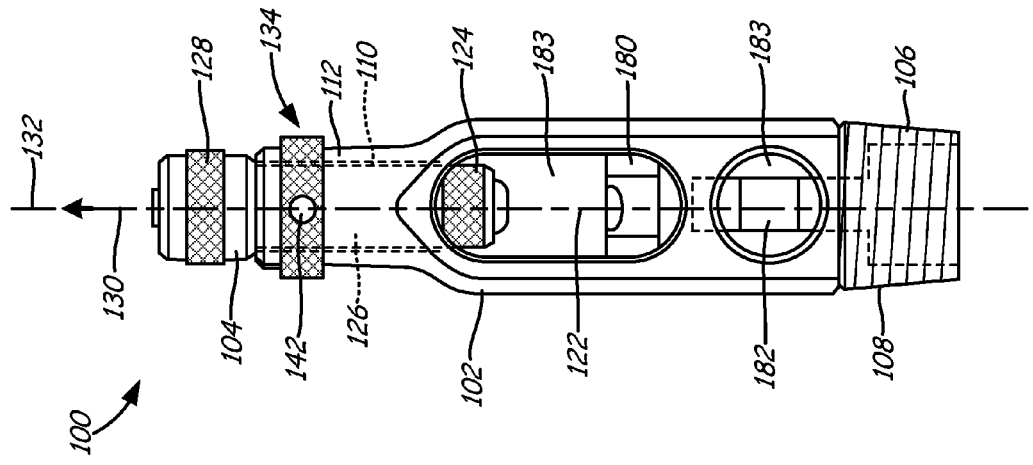
FIGS. 1 and 2 respectively are side and front views of a pipe alignment tool in accordance with embodiments of the invention.
Figure 1:
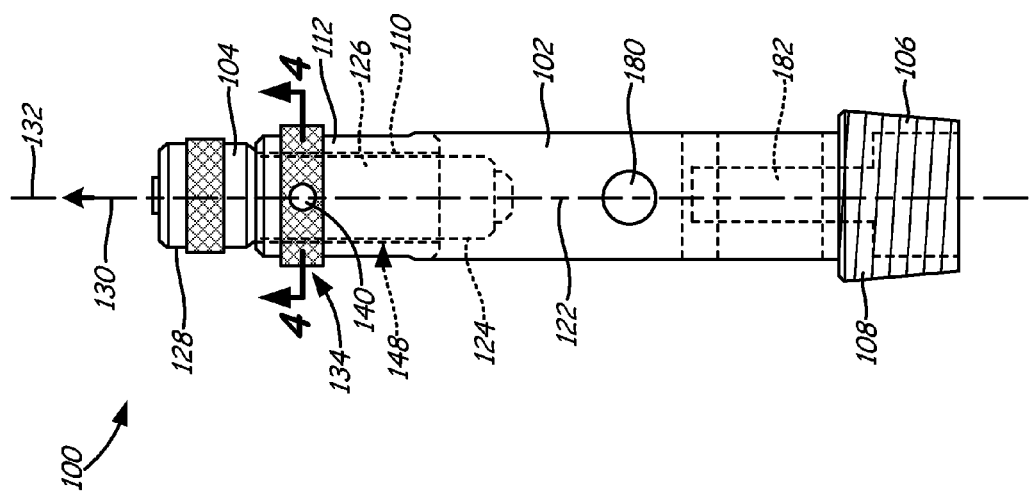

Embodiments of the invention are directed to a pipe alignment tool and a method of using the pipe alignment tool including calibrating the tool to produce a properly aligned laser beam. FIGS. 1 and 2 respectively show side and front views of a pipe alignment tool 100 in accordance with embodiments of the invention. The tool 100 generally comprises a main body 102 and a laser source 104.

The main body 102 may be formed of aluminum or other suitable material and includes a threaded external surface 106 at a proximal end 108 and a cylindrical bore 110 at a distal end 112. The threaded proximal end 108 is generally configured to attach to a pipe and/or a pipe fitting 114, as shown in the isometric view of FIG. 3. The pipe fitting 114 may be any standard pipe fitting configured to connect pipe sections together, such as pipe sections 116 and 118 shown in FIG. 3. The pipe fitting 114 generally includes a threaded socket that is configured to receive the threaded proximal end 108. In some embodiments, an adapter can be screwed over the threaded proximal end 108 of the main body 102 to adapt the tool 100 to fit various types of pipe fittings 114. The threaded proximal end 108 may also be attached to an end of a pipe or conduit using an appropriate fitting or adapter.

In one embodiment, the cylindrical bore 110 has a central axis 122 that is substantially coaxial to the threaded proximal end 108. When the threaded proximal end 108 is received within a threaded socket 120 of a pipe fitting 114, the central axis 122 of the cylindrical bore 110 generally aligns with the axis of the threaded socket 120 of the pipe fitting 114. As a result, the attachment of the main body 102 to the socket 120 of a pipe fitting 114 positions the cylindrical bore 110 in coaxial alignment with the axis of the socket 120. Thus, when the alignment tool 100 is secured to the socket 120 of a pipe fitting 114, the central axis 122 of the cylindrical bore 110 is oriented in the same manner that a pipe mounted to the fitting 114 by the socket 120 would have.

In one embodiment, the laser source 104 has a proximal end 124 that is removably received within the cylindrical bore 110. In one embodiment the laser source 104 includes an intermediary portion 126 located between the proximal end 124 and a distal end 128 that has a cylindrical cross-section. The laser source 104 is configured to discharge a laser beam (represented by arrow 130) through the distal end 128 and along a laser axis 132, as shown in FIG. 1.

In one embodiment, the cylindrical bore 110 has a slightly larger interior diameter than the diameter of the intermediary portion 126. This allows the laser source to be removably received within the cylindrical bore 110. The laser source 104 may be temporarily secured within the bore 110 using a set screw or other component. In one embodiment, the proximal end 124 of the laser source 104 has a threaded exterior surface allowing the laser source to be screwed into a cooperating threaded internal surface of the bore 110. Other techniques may be employed to removably attach the laser source 104 to the main body 102.

In one embodiment, the alignment tool 100 includes a laser calibrator 134 that is generally configured to align the laser axis 132 to the central axis 122 of the bore 110 to ensure that the discharged laser beam 130 is accurately projected along the axis of the pipe fitting socket 120, or a pipe, to which the threaded proximal end 108 of the alignment tool 100 is mounted. In one embodiment, the laser calibrator 134 is configured to adjust the orientation of the laser source 104 relative to the central axis 122 to coaxially align the laser axis 132 with the central axis 122. In one embodiment, this alignment between the laser axis 132 and the central axis 122 is achieved through the adjustment of the position of the laser source 104 within the cylindrical bore 110 in two orthogonal directions within a plane that is perpendicular to the central axis 122.

Figure 4:
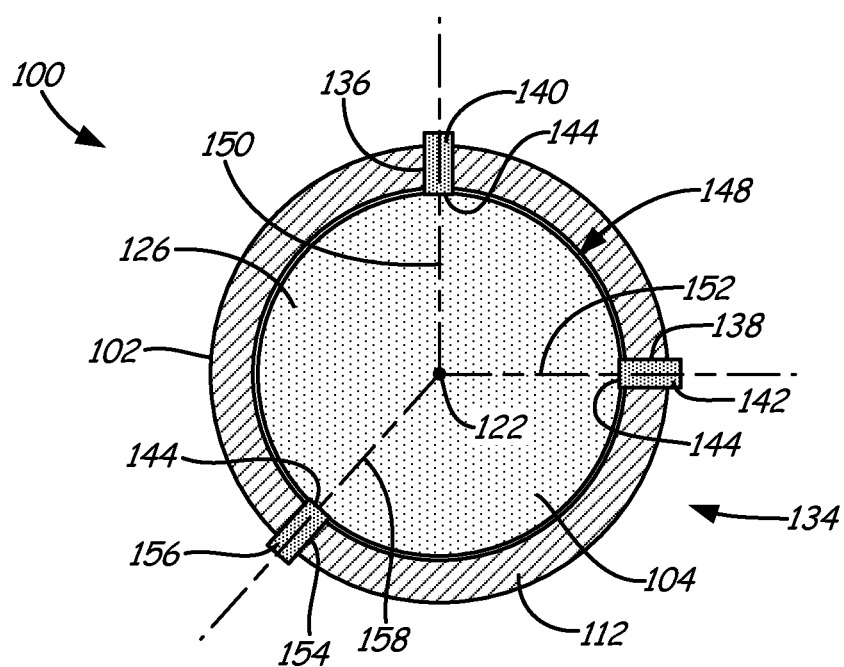
FIG. 4 is a simplified cross-sectional view of the pipe alignment tool of FIG. 1 taken generally along line 4-4.

In one embodiment, the laser calibrator 134 includes at least one threaded bore, such as two threaded bores 136 and 138 that extend through the main body 102 at the distal end 112 to the cylindrical bore 110, as shown in the simplified cross-sectional view of FIG. 4, which is generally taken along line 4-4 of FIG. 1. In one embodiment, the bores 136 and 138 are threaded bores that receive screws 140 and 142, respectively. The screws 140 and 142 each include a distal end 144 that engages the exterior surface 148 of the intermediary portion 126 of the laser source 104. The engagement between the screws 140 and 142 and the intermediary portion 126 secures the laser source 104 within the cylindrical bore 110.

In one embodiment, the threaded bore 136 has a bore axis 150, and the threaded bore 138 has a bore axis 152. In one embodiment, the axes 150 and 152 are transverse to each other. In accordance with another embodiment, the bore axes 150 and 152 are approximately perpendicular to each other. The rotation of the screw 140 controls the position of the laser source 104 along the bore axis 150, and rotation of the screw 142 controls the position of the laser source 104 along the bore axis 152 in a plane that is perpendicular to the central axis 122.

While the laser calibrator 134 is depicted as including two threaded bores 136 and 138 having substantially perpendicular bore axes 150 and 152, additional embodiments of the laser calibrator 134 include the use of three or more threaded bores that are angularly disposed about the central axis 122. In one embodiment, the laser calibrator 134 includes a third threaded bore 154 and a corresponding screw 156 that can be used to drive the laser source 104 toward the central axis 122 along a bore axis 158, as shown in FIG. 4. In one embodiment, the three axes 150, 152 and 158 are angularly displaced from each other about the central axis 122 by 120 degrees. Other embodiments of the laser calibrator 134 include more than three threaded bores angularly disposed about the central axis 122, each including a corresponding screw to adjust the position of the laser source 104 relative to the cylindrical bore 110 and secure the laser source 104 within the cylindrical bore 110.

The orientation of the laser source 104 within the cylindrical bore 110 is adjusted through the rotation of the screws of the laser calibrator 134. For instance, screw 140 may be rotated to drive the exterior surface 148 engaged by the distal end 144 of the screw 140 to move the laser source 104 along the bore axis 150 toward the central axis 122, or retract the distal end 144 of the screw 140 to allow the laser source to move along the bore axis 150 away from the central axis 122. Likewise, the screws 142 and 156 may be rotated to respectively drive the laser source 104 along the axis 152 or 158 toward the central axis 122, or allow the laser source 104 to move away from the central axis 122 along the axis 152 or 158.

Figure 3:
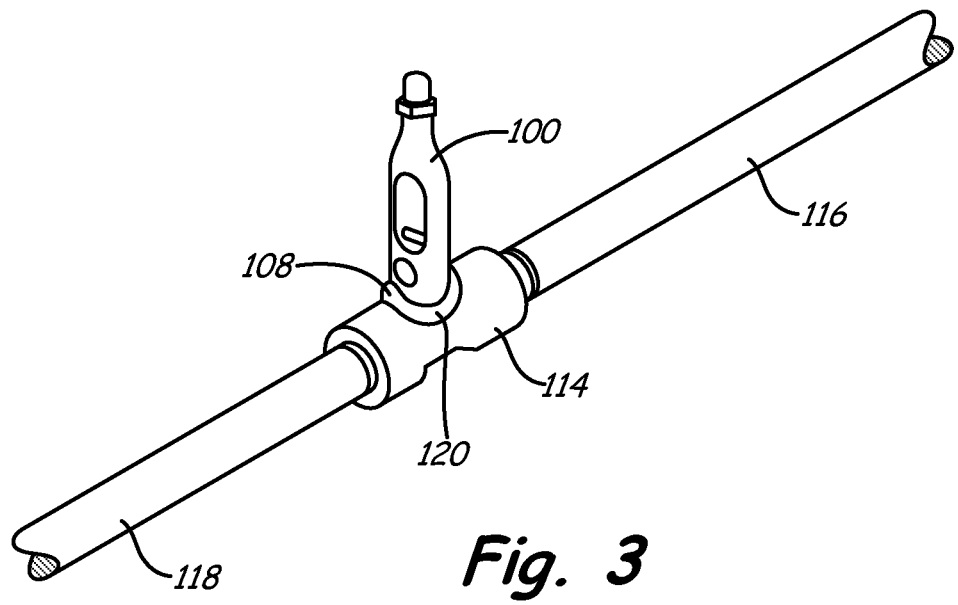
FIG. 3 is an isometric view illustrating the attachment of a pipe alignment tool to a fitting in accordance with embodiments of the invention.
Figure 5:
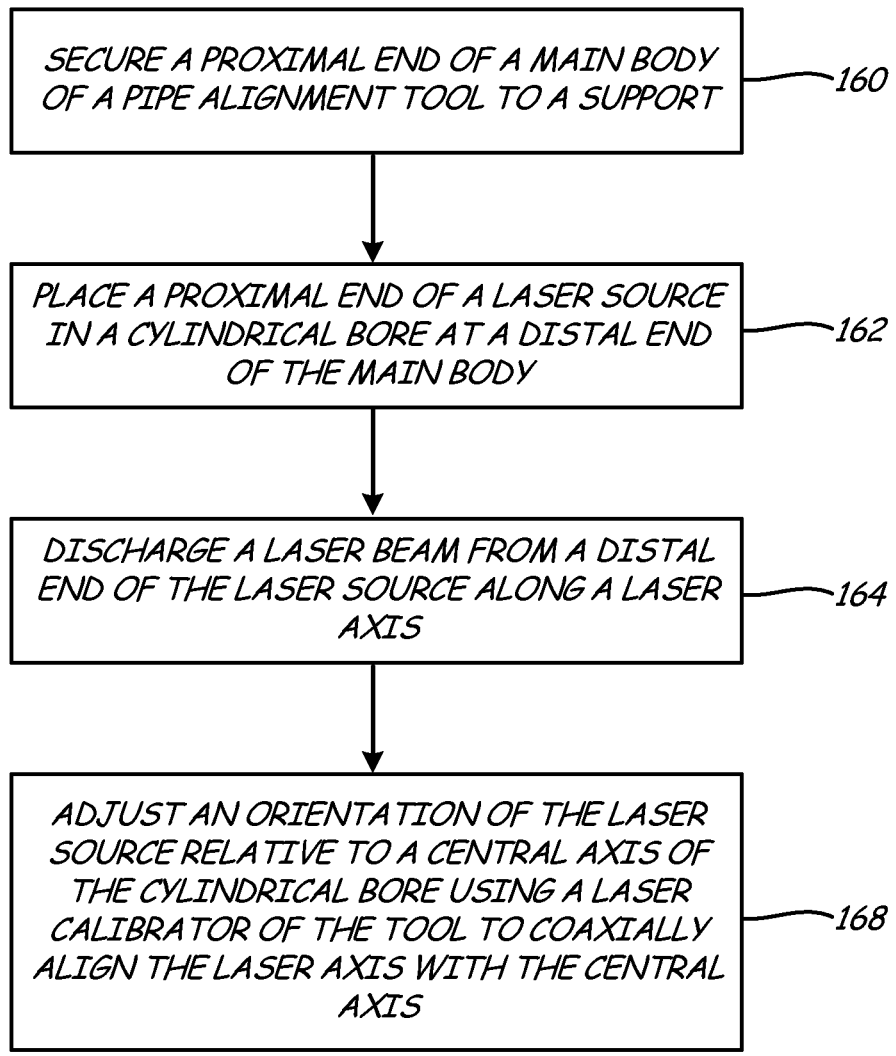
FIG. 5 is a flowchart illustrating a method in accordance with embodiments of the invention.

Embodiments of the invention are also directed to a method of aligning the laser axis 132 with the central axis 122 through the adjustment of the position of the laser source 104 relative to the cylindrical bore 110 using the laser calibrator 134. FIG. 5 is a flowchart illustrating embodiments of the method. At 160, the proximal end 108 of the main body 102 of the pipe alignment tool 100 is secured to a support. In one embodiment, the proximal end 108 is secured to a pipe or conduit using a suitable pipe fitting, such as illustrated in FIG. 3. In accordance with other embodiments, the support comprises a conduit or pipe support. Other embodiments of the support include structures through which pipe or conduit is to extend.

At 162, the proximal end 124 of the laser source 104 is placed in the cylindrical bore 110 located at a distal end 112 of the main body 102, as shown in FIGS. 1 and 2.

Figure 6:
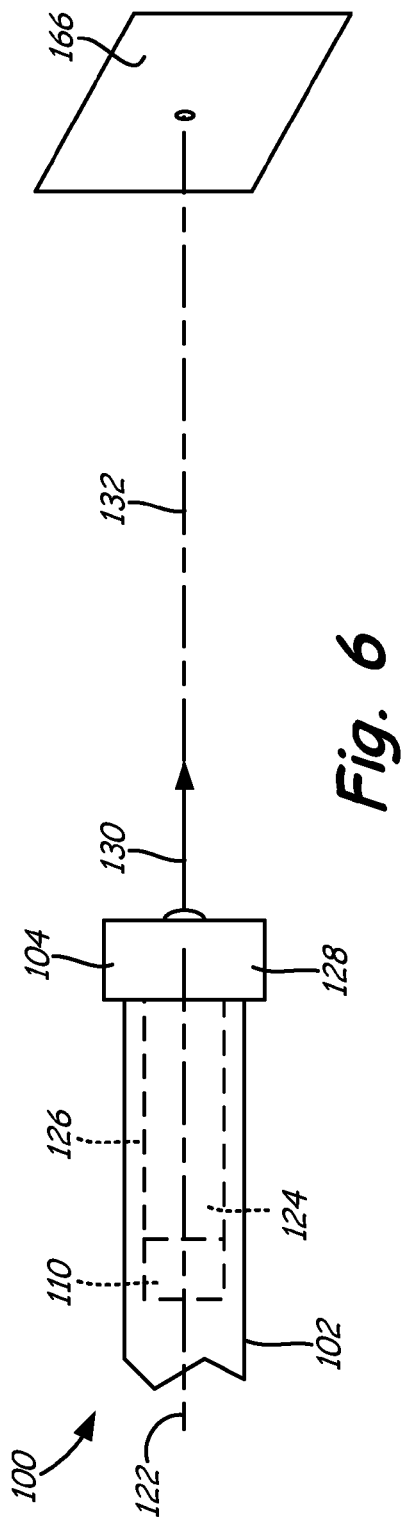
FIG. 6 is a simplified side view illustrating the projection of a laser beam from the pipe alignment tool to a target.

At 164, a laser beam 130 is discharged from the distal end 128 of the laser source 104 along the laser axis 132. In one embodiment of step 162, the laser beam 130 is directed toward a target 166 located a distance away from the tool 100, as shown in the simplified side view provided in FIG. 6.

At 168 of the method, an orientation of the laser source 104 is adjusted relative to the central axis 122 of the cylindrical bore 110 using the laser calibrator 134 to coaxially align the laser axis 132 with the central axis 122. In one embodiment, the adjusting step 168 involves rotating one or more of the screws of the laser calibrator 134, such as screws 140, 142 and 156 to adjust the orientation of the laser source 104 relative to the central axis 122.

Figure 7:
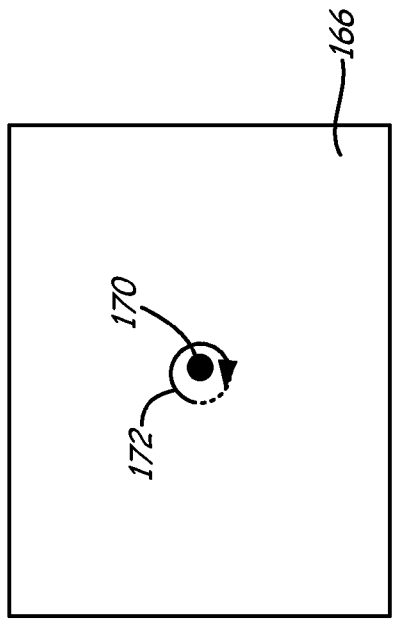
FIG. 7 is a simplified diagram illustrating aligned and misaligned laser projections on a target.

In one embodiment of the adjusting step 168, the laser source 104 is rotated within the cylindrical bore 110 as the laser beam 130 is discharged. The laser beam 130 is viewed on the surface of the target 166 as the laser source 104 is rotated within the cylindrical bore 110. When the laser axis 132 is coaxial to the central axis 122, the projected laser beam 130 on the surface of the target 166 will impact a single spot on the target 166, such as spot 170 shown in the front view of the target 166 provided in FIG. 7. However, when the laser axis 132 is not coaxial to the central axis 122, rotation of the laser source 104 within the cylindrical bore 110 causes the laser beam 130 to track a circle 172 on the target 166, as shown in FIG. 7. When this misalignment is viewed during the rotation of the laser source 104, the orientation of the laser source 104 within the cylindrical bore 110 is adjusted using the laser calibrator in accordance with embodiments described herein. The rotating, viewing and adjusting steps are then repeated until the discharged laser beam 130 substantially impacts a single point on the target 166 during the rotation of the laser source 104 within the cylindrical bore 110, indicating that the laser axis 132 is coaxial to the central axis 122. This calibration of the pipe alignment tool 100 prepares it for accurate pipe, conduit and fitting axis projections even over long distances.

In one embodiment, the pipe alignment tool 100 includes one or more bubble levels, such as bubble levels 180 and 182, which are supported by the main body 102, as shown in FIGS. 1 and 2. The one or more bubble levels of the tool 100 may be used to assist in orienting piping or conduit to which the tool 100 is attached. In one embodiment, the main body 102 includes openings 183 through which the one or more bubble levels can be viewed. In one embodiment, the bubble level 182 is supported by the main body 102 and substantially parallel alignment with the central axis 122. In accordance with one embodiment, the bubble level 180 is supported by the main body 102 substantially perpendicular to the central axis 122.

In one embodiment, the tool 100 includes one or more lights 184 that are configured to illuminate the one or more bubble levels of the tool 100, as shown in FIG. 8, which is a simplified side view of a portion of the tool 100 in accordance with embodiments of the invention. For instance, the tool 100 may include a light 184 located at an end 186 of the bubble level 180, which is configured to illuminate the bubble level 180. The tool 100 may also include a light 184 located at an end 188 of the bubble level 182, which is configured to illuminate the bubble level 182. In one embodiment, the tool 100 includes an on-board battery 190 and a switch 192 that controls the flow of electrical current to the one or more lights 184 to trigger the one or more lights 184 on and off.

Figure 10:
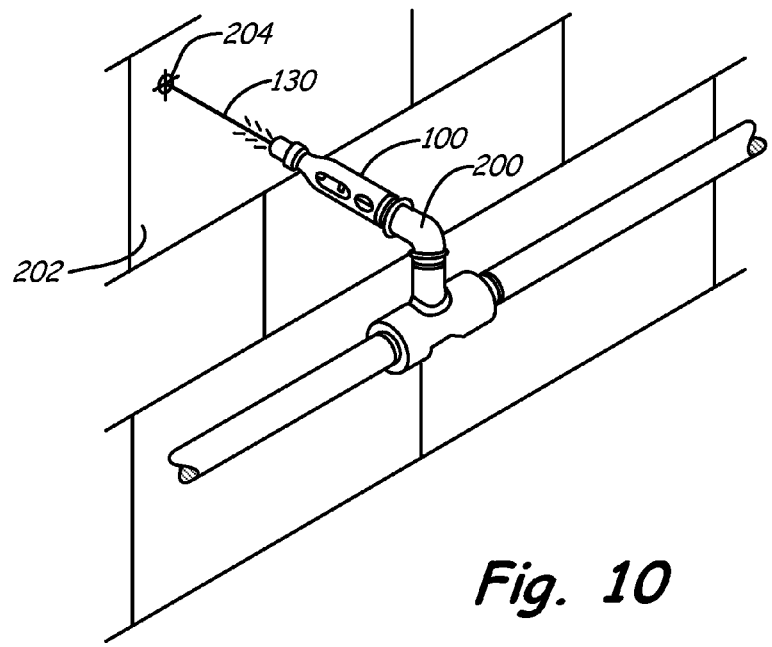
Figure 11:
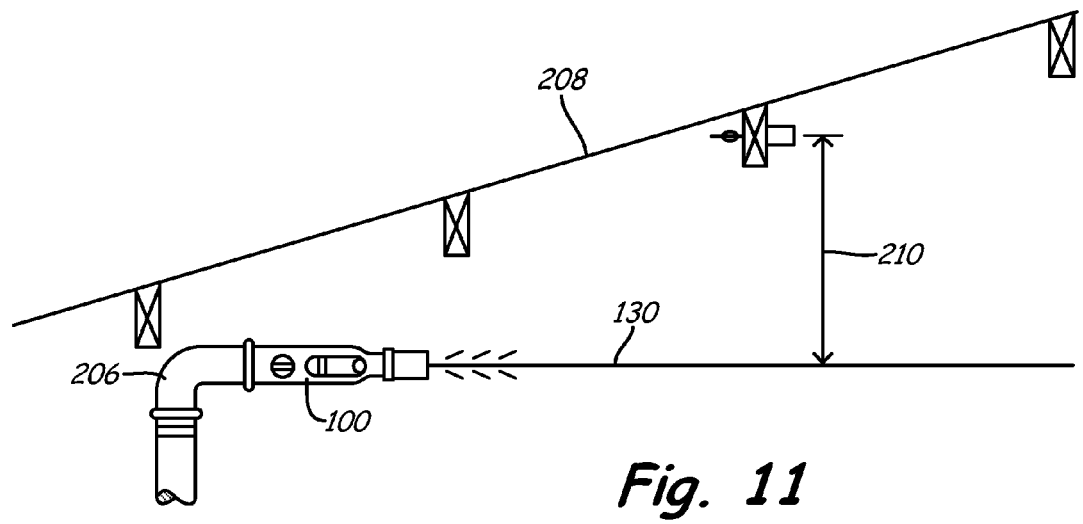

FIGS. 9-11 illustrate exemplary uses of the pipe alignment tool 100 in accordance with embodiments of the invention. The pipe alignment tool 100 may be used to assist in the alignment of a sprinkler system to a sealing grid 194, as shown in FIG. 9. In general, the pipe alignment tool 100 is attached to a fitting 196 from which the pipe and sprinkler head is to extend through the ceiling grid 194. The projection of the laser beam 130 by the pipe alignment tool 100 identifies the spot 198 where a hole needs to be made in the ceiling grid 194, through which the pipe and sprinkler head will extend.

FIG. 10 illustrates the use of the pipe alignment tool 100 to determine a location for making a hole in a wall or other structure where pipe attached to a fitting 200 will extend. The proximal end 108 is attached to the fitting 200 to align the pipe alignment tool 100 with the axis of the fitting 200. The pipe alignment tool 100 then discharges the laser beam 130, which is projected to the wall or structure 202 and identifies the location 204 where a hole needs to be formed to accommodate the piping or conduit.

The pipe alignment tool 100 may also be used to project a laser beam 130 that is used to represent piping that will be attached to a fitting 206. Measurements can then be made from a roof or ceiling 208 to determine the length of piping that is to connect to the pipe attached to the fitting 206, or to determine the length of conduit or piping support structure that will be secured to the roof or ceiling 208. Thus, a distance 210 may be measured to the laser beam 130 from the roof or ceiling 208 to determine the length of pipe or support structure required for the job.

Although the present invention has been described with reference to preferred embodiments, workers skilled in the art will recognize that changes may be made in form and detail without departing from the spirit and scope of the invention.

What is claimed is:

1. A pipe alignment tool comprising:
   a main body having a threaded external surface on a proximal end and a cylindrical bore at a distal end, the cylindrical bore having a central axis;
   a laser source having a proximal end removably received in the distal end of the cylindrical bore, and a distal end protruding from the distal end of the cylindrical bore, the laser source configured to discharge a laser beam through a distal end of the laser source along a laser axis; and
   a laser calibrator configured to adjust the orientation of the laser source relative to the central axis to coaxially align the laser axis with the central axis.

2. The tool of claim 1, wherein the laser calibrator is configured to adjust the position of the laser source within the cylindrical bore in two orthogonal directions within a plane that is perpendicular to the central axis.

3. The tool of claim 2, wherein the laser calibrator comprises:
   first and second threaded bores each extending through the main body at the distal end to the cylindrical bore; and
   first and second screws respectively received in the first and second threaded bores, the first and second screws each having a distal end that engages an exterior surface of the laser source.

4. The tool of claim 3, wherein:
   the first threaded bore has a first bore axis;
   the second threaded bore has a second bore axis; and
   the first and second bore axes are transverse to each other.

5. The tool of claim 4, wherein the first and second bore axes are approximately perpendicular to each other.

6. The tool of claim 3, wherein the first and second screws secure the laser source within the cylindrical bore.

7. The tool of claim 3, wherein the laser source is pinched between the first and second screws.

8. The tool of claim 3, wherein the exterior surface of the laser source is cylindrical.

9. The tool of claim 3, further comprising a first bubble level supported within the main body, wherein a wall of the main body includes a first opening through which the first bubble level may be viewed.

10. The tool of claim 9, wherein the first bubble level is supported substantially parallel with the central axis.

11. The tool of claim 10, further comprising a second bubble level supported within the main body, wherein the second bubble level is supported substantially perpendicularly to the central axis, and is viewable through a second opening in the wall of the main body.

12. The tool of claim 11, further comprising a first light supported by the main body and configured to illuminate the first bubble level through an end of the first bubble level.

13. A method comprising steps of:
   securing a proximal end of a main body of a pipe alignment tool to a support;
   placing a proximal end of a laser source in a cylindrical bore at a distal end of the main body;
   discharging a laser beam from a distal end of the laser source along a laser axis; and
   adjusting an orientation of the laser source relative to a central axis of the cylindrical bore using a laser calibrator of the tool to coaxially align the laser axis with the central axis comprising:
   rotating the laser source within the cylindrical bore;
   viewing the discharged laser on a target surface during the rotating step; and repeating the rotating, viewing and adjusting steps until laser axis is coaxial to the central axis.

14. The method of claim 13, wherein:

the laser calibrator comprises:
- first and second threaded bores each extending through the main body at the distal end to the cylindrical bore, the first and second threaded bores respectively having first and second bore axes which are substantially perpendicular to each other and the central axis; and
- first and second screws respectively received in the first and second threaded bores, the first and second screws each having a distal tip that engages an exterior surface of the laser source; and the adjusting step comprises:
- rotating the first screw; and
- adjusting the orientation of the laser source relative to the central axis of the cylindrical bore responsive to rotating the first screw.

15. The method of claim 14, wherein the adjusting step comprises:

rotating the second screw; and adjusting the orientation of the laser source relative to the central axis of the cylindrical bore responsive to rotating the second screw.

16. The method of claim 13, further comprising securing a conduit support for supporting conduit coaxially along the laser beam.

\* \* \* \* \*